United States Patent [19]
Bade

[11] Patent Number: 5,868,503
[45] Date of Patent: Feb. 9, 1999

[54] ROLLER BEARING

[75] Inventor: Karl-Heinz Bade, Waldmichelbach, Germany

[73] Assignee: Firma Carl Freudenberg, Germany

[21] Appl. No.: 999,636

[22] Filed: Oct. 31, 1997

[30] Foreign Application Priority Data

Nov. 5, 1996 [DE] Germany ......................... 196 45 530.8

[51] Int. Cl.⁶ .................................................. F16C 27/04
[52] U.S. Cl. ........................................... 384/536; 384/582
[58] Field of Search ..................................... 384/536, 582, 384/535, 581, 513, 515, 495, 496, 497, 498

[56] References Cited

U.S. PATENT DOCUMENTS

| | | | |
|---|---|---|---|
| 2,414,335 | 1/1947 | Schroeder | 384/536 |
| 2,439,269 | 4/1948 | Shafer | 384/536 |
| 2,674,505 | 4/1954 | Pfenninger, Jr. et al. | 384/536 |
| 2,689,769 | 9/1954 | Ware, Jr. | 384/536 X |
| 2,733,108 | 1/1956 | Cowles | 384/582 |

*Primary Examiner*—Thomas R. Hannon
*Attorney, Agent, or Firm*—Kenyon & Kenyon

[57] ABSTRACT

A roller bearing for the radial support of two component parts, includes an inner race, an outer race and rolling elements disposal between the inner and outer races, as well as a damping layer between at least one race and one of the component parts. The outer race has an outer contour facing the component part. The component part has an inner contour that faces the outer race, and essentially corresponds to the shape of the outer contour. With respect to an outer race having a cylindrical outer contour, the outer race according to the present invention shows an increase in thickness, at least sectionally, preferably in the area of the rolling element. The outer contour is shaped such that a pendulum motion of the bearing or of the component part, with deformation of the damping layer, is limited.

20 Claims, 1 Drawing Sheet

ROLLER BEARING

FIELD OF THE INVENTION

Roller bearings for the radial support of two component parts are common machine elements which are used in diverse variants in machine construction. In designing these bearings, the loads of the component parts are of special importance, including, for example, the peak loads produced by vibrations. Therefore, there is the need to dampen these vibrations. This is accomplished by a damping layer arranged between the bearing and a component part.

BACKGROUND OF THE INVENTION

The in-company state of technological development for producing vibrationally damped bearing units consists in joining conventional bearings to the bearing flange through vulcanization, with the assistance of the elastomeric damping layer. However, because of the high temperatures necessary to carry out the vulcanization, the use of permanently lubricated bearings causes special problems, since the lubricant is heated beyond the normal operating temperature of the bearing, and the seal washers of the bearing are no longer impervious. Therefore, solely because of the manufacturing process, it is necessary to use high-quality, specially sealed bearings in order to produce a vibrationally damped bearing unit.

OBJECTS AND SUMMARY OF THE INVENTION

An object of the invention consists in producing a roller bearing which allows a flexible support, without having to use specially sealed, permanently lubricated roller bearings.

According to an embodiment of the present invention, the outer race of the roller bearing has an outer contour facing a component part, such as a bearing retainer or bearing flange. The component part has an inner contour that faces the outer race. The inner contour of the component part corresponds essentially to the outer contour of the outer race. In comparison to a roller bearing that has an outer race with a cylindrical outer contour, the outer race according to the present invention shows an increase in thickness, at least sectionally, in the area, for example, of the rolling elements of the bearing. The outer contour is shaped so that a pendulum motion or lateral rocking motion of the bearing or of the component part is limited. A damping layer may be placed in a gap formed between the outer contour of the outer race and the inner contour of the component part. Thus, a pendulum motion of the bearing or the component part may cause deformation of the damping layer, but the motion is limited by the contour shape of the outer race and the component part.

A roller bearing constructed as discussed above has the advantage that the damping layer between the outer race of the bearing and the component part can be forced into place under pre-stressing. The damping layer may thus be prevented from creeping out of place due to the frictional engagement resulting from the tight fit of the damping material between the outer race and the component part. Also, the damping layer is prevented from moving out of place because of the positive locking provided by the shape of the contour. It is especially important to safeguard the bearing against pendulum motions, since they can cause the damping layer to work its way out of place.

For example, the outer contour of the outer race may have a roof shape composed of two conical surfaces directed towards each other. The outer contour faces a similarly roof shaped inner contour of the component part, and is separated therefrom by a gap containing the damping material. Alternative to the roof-shaped contour, the outer contour may have, for example, curved sections, or a combination of straight sections and curved sections.

The gap between the outer race of the bearing and the component part may have a constant thickness and may be essentially completely filled by the damping layer. The thickness of the damping layer may also be constant.

Further development of the bearing includes placement of seal washers at the sides of the rolling elements, which prevents lubricant from escaping from the roll elements. This feature avoids problems associated with high temperatures which have proven to be particularly disadvantageous because of the vulcanization.

BRIEF DESCRIPTION OF THE DRAWINGS

Various embodiments of the invention are explained more precisely with the aid of the drawings, which show.

DETAILED DESCRIPTION OF THE INVENTION

Figure 1:
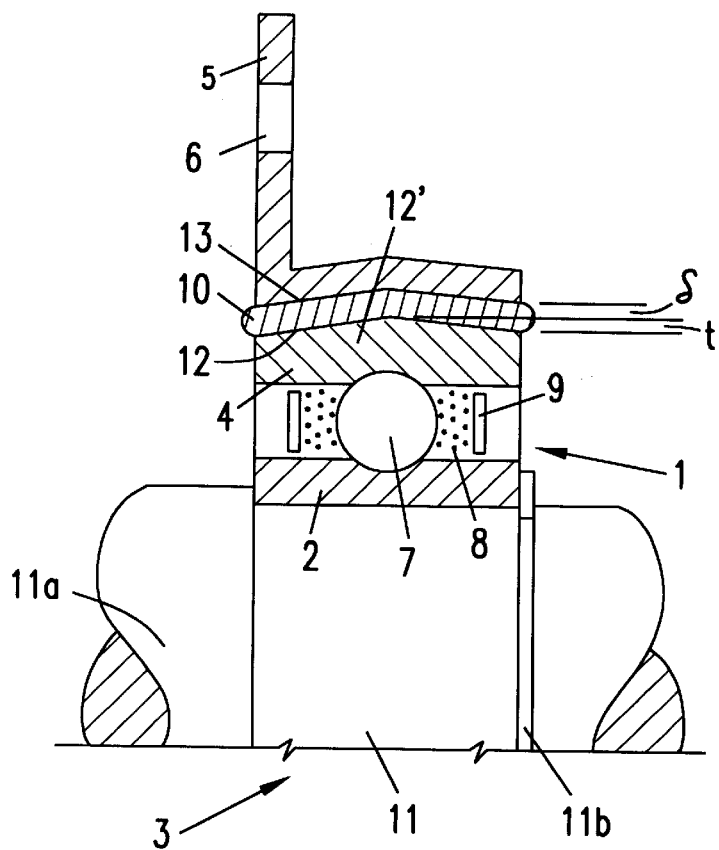
FIG. 1 a roller bearing with a roof-shaped outer contour.

Shown in FIG. 1 as an example for a roller bearing is a grooved ball bearing 1 which, with an inner race 2, is supported on a shaft 3 as a first component part, and with an outer race or outer ring bearing 4, is supported in a bearing retainer 5 as a second component part. Bearing retainer 5 has an opening 6 through which joining means (not shown) can be inserted for fastening to a motor housing or the like.

The grooved ball bearing has rolling elements constructed as balls 7 which are arranged between inner race 2 and outer race 4. Balls 7 are lubricated by a lubricant 8 which is prevented from escaping from bearing 1 by packing washers 9 on both sides of balls 7. In this manner, a permanent lubrication of bearing 1 is assured.

Located between bearing retainer 5 and outer race 4 is a damping layer 10 of elastomeric material which extends over the entire axial width of the bearing. Damping layer 10 is forced in under pre-stressing and is joined in a frictionally engaged manner to race 4 and bearing retainer or bearing flange 5.

Inner race 2 is supported on the shaft 3 at a specified location 11, braced in the axial direction against, for example, a shaft shoulder 11a on one side of the bearing 1 and against a retaining ring 11b on the other side.

The outer race 4 has an outer contour 12 in the shape of a roof. That is, it has an outside diameter which steadily increases from one side of bearing 1 to the middle of bearing 1 by an amount t, and which steadily decreases from the middle of bearing 1 to the opposite side by approximately the same amount. In this context, a deflection location 12' exists in the middle of outer contour 12, a radius being provided at the deflection location 12' for the purpose of forcing in the damping layer. The clearance between outer contour 12 of the outer race 4 and inner contour 13 of bearing retainer 5 is essentially constant, since inner contour 13 of bearing retainer 5 is constructed to correspond to the outer contour 12 of the outer race 4.

The contouring may be, for example, dimensioned so that the greatest outside diameter of outer race 4 is smaller than the smallest inside diameter of bearing retainer 5, so that an installation space δ exists, whereby the outer race 4 and bearing retainer 5 may be easily assembled by axially pushing them together. Furthermore, the shape of the contour counteracts a pendulum motion of bearing 1. This is achieved with outer contour 12 in FIG. 1 in that, in response to a pendulum motion of the bearing, and with increasing deformation of the damping layer 10, an increased force is required and finally a limit stop is reached. Because of the deflection location 12' in the middle effecting a positive locking, it is not possible for damping layer 10 to work its way out of the interface between the bearing and the component part.

Figure 2:
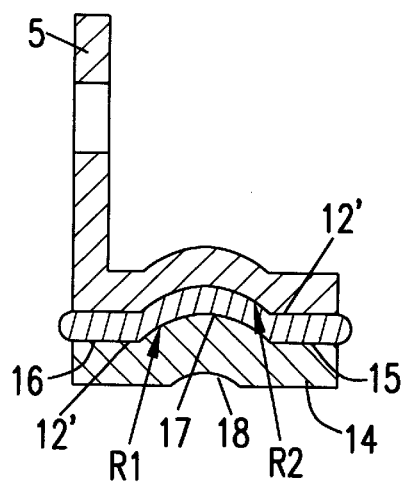
FIG. 2 a roller bearing with a sectionally spherical outer contour.

FIG. 2 shows another outer contour. Outer ring bearing or outer race 14 has an outer contour comprising three sections. The laterally arranged sections include, cylindrical areas 15, 16 on either side of a spherical area 17 of radius $R_1$. The spherical area 17 lies opposite raceway 18. The spherical area 17 is similarly copied in bearing retainer 5 having the radius $R_2$. $R_1$ and $R_2$ may correspond, but also may be different. In particularly, for example, a greater radius $R_2$ can be selected.

Figure 3:
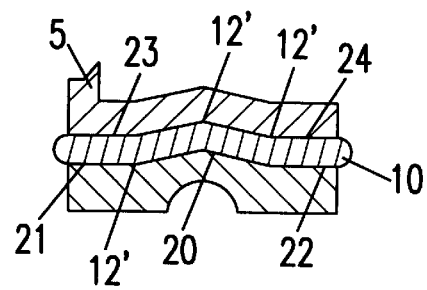
FIG. 3 a roller bearing with only a sectionally roof-shaped outer contour.

FIG. 3 shows a further refinement, in which the spherical section of FIG. 2 was replaced by a roof shape 20. A pendulum motion of the bearing is prevented here, as in the previous embodiment discussed, by the striking action against sections 21, 23, or 22, 24.

Radii of approximately 3 mm are provided at deflection locations 12' in the exemplary embodiments shown in FIG. 2 and 3, as well, so that when the components are forced together axially, the tubular damping layer 10 is guided over the deflection locations 12' and does not get stuck. The same holds true for inner contour 13 of bearing flange 5.

In the examples shown, bearing flange 5 is subject to vibrations. Mainly, these vibrations act radially, but a small portion also work axially. Due to the arrangement of damping layer 10 between bearing flange 5 and outer race 4 of bearing 1, the vibrations are at least partially damped before being introduced into bearing 1, whereby the running smoothness of shaft 3 is increased and the load of bearing 1 is reduced.

What is claimed is:

1. A roller bearing for the radial support of first and second component parts, the roller bearing comprising:

an inner race disposed adjacent to the first component part;

an outer race disposed adjacent to the second component part;

rolling elements disposed in rolling contact between the inner race and the outer race;

a damping layer disposed between the outer race and the second component part;

wherein the outer race has an outer contour facing the second component part, and the second component part has an inner contour facing the outer race;

wherein the inner contour of the second component part essentially corresponds in shape to the outer contour of the outer race;

wherein the outer race has a first end, a second end, and an intermediate point, the intermediate point being located in an area of the rolling elements, and the outer race having an increase in its outside diameter at the intermediate point;

wherein the outside diameter of the outer race steadily increases from the first end of the outer race to the intermediate point, and steadily decreases from the intermediate point to the second end of the outer race; and wherein the outside diameter of the outer race at the intermediate point, which represents the largest outside diameter of the outer race, is smaller than a smallest inside diameter of the second component part, so that an installation space (δ) exists between the largest outside diameter of the outer race and the smallest inside diameter of the second component part, whereby the outer race may be inserted axially into the second component part.

2. The roller bearing as defined by claim 1, wherein the outer contour of the outer race has two conical surfaces directed toward one another.

3. The roller bearing as defined by claim 2 further comprising:

a gap between the outer race and the second component part, the gap having an essentially constant width and being essentially completely filled by the damping layer.

4. The roller bearing a defined by claim 1, wherein the damping layer is an elastomeric material.

5. The roller bearing as defined by claim 1, wherein the damping layer has an essentially constant thickness.

6. The roller bearing as defined by claim 1, further comprising:

seal washers disposed at the sides of the rolling elements, the seal washers preventing a lubricant from escaping from the rolling elements.

7. A roller bearing for the radial support of first and second component parts, the roller bearing comprising:

an inner race disposed adjacent to the first component part;

an outer race disposed adjacent to the second component part;

rolling elements disposed in rolling contact between the inner race and the outer race;

a damping layer disposed between the outer race and the second component part;

wherein the outer race has an outer contour facing the second component part, and the second component part has an inner contour facing the outer race;

wherein the inner contour of the second component part essentially corresponds in shape to the outer contour of the outer race;

wherein the outer race has a first end, a second end, and an intermediate point, the intermediate point being located in an area of the rolling elements, and the outer race having an increase in its outside diameter at the intermediate point;

wherein the outside diameter of the outer race is constant from the first end of the outer race to a first deflection point, increases from the first deflection point to the intermediate point, decreases from the intermediate point to a second deflection point, and is constant from the second deflection point to the second end of the outer race; and wherein the outside diameter of the outer race at the intermediate point, which represents the largest outside diameter of the outer race, is smaller than a smallest inside diameter of the second component part, so that an installation space (δ) exists between the largest outside diameter of the outer race and the smallest inside diameter of the second component part, whereby the outer race may be inserted axially into the second component part.

8. The roller bearing as defined by claim 7, wherein the outer contour of the outer race has two conical surfaces directed toward one another.

9. The roller bearing as defined by claim 7, wherein the outer contour of the outer race has curved sections.

10. The roller bearing as defined by claim 7, further comprising:
   a gap between the outer race and the second component part, the gap having an essentially constant width and being essentially completely filled by the damping layer.

11. The roller bearing a defined by claim 7, wherein the damping layer is an elastomeric material.

12. The roller bearing as defined by claim 7, wherein the damping layer has an essentially constant thickness.

13. The roller bearing as defined by claim 7, further comprising:
   seal washers disposed at the sides of the rolling elements, the seal washers preventing a lubricant from escaping from the rolling elements.

14. A roller bearing for the radial support of first and second component parts, the roller bearing comprising:
   an inner race disposed adjacent to the first component part;
   an outer race disposed adjacent to the second component part;
   rolling elements disposed in rolling contact between the inner race and the outer race;
   a damping layer disposed between the outer race and the second component part;
   wherein the outer race has an outer contour facing the second component part, and the second component part has an inner contour facing the outer race;
   wherein the inner contour of the second component part essentially corresponds in shape to the outer contour of the outer race;
   wherein the outer race has a first end, a second end, and an intermediate point, the intermediate point being located in an area of the rolling elements, and the outer race having an increase in its outside diameter at the intermediate point;
   wherein the outside diameter of the outer race increases from the first end of the outer race to the intermediate point, and decreases from the intermediate point to the second end of the outer race; and
   wherein the outside diameter of the outer race at the intermediate point, which represents the largest outside diameter of the outer race, is smaller than a smallest inside diameter of the second component part, so that an installation space ($\delta$) exists between the largest outside diameter of the outer race and the smallest inside diameter of the second component part, whereby the outer race may be inserted axially into the second component part.

15. The roller bearing as defined by claim 14, wherein the outer contour of the outer race has two conical surfaces directed toward one another.

16. The roller bearing as defined by claim 14, wherein the outer contour of the outer race has curved sections.

17. The roller bearing as defined by claim 14, further comprising:
   a gap between the outer race and the second component part, the gap having an essentially constant width and being essentially completely filled by the damping layer.

18. The roller bearing a defined by claim 14, wherein the damping layer is an elastomeric material.

19. The roller bearing as defined by claim 14, wherein the damping layer has an essentially constant thickness.

20. The roller bearing as defined by claim 14, further comprising:
   seal washers disposed at the sides of the rolling elements, the seal washers preventing a lubricant from escaping from the rolling elements.

* * * * *